United States Patent [19]

Gore

[11] 4,082,341
[45] Apr. 4, 1978

[54] VEHICLE AIR DEFLECTOR

[76] Inventor: Bobby Joe Gore, 1440 D. Cameron Ct., Wilmington, N.C. 28401

[21] Appl. No.: 752,475

[22] Filed: Dec. 20, 1976

[51] Int. Cl.² .............................................. B60J 9/04
[52] U.S. Cl. .................................................... 296/1 S
[58] Field of Search ................... 296/1 S, 91; 105/2 R

[56] References Cited

U.S. PATENT DOCUMENTS

| 3,695,673 | 10/1972 | Meadows | 296/1 S |
| 3,947,065 | 3/1976 | Geiger | 296/1 S |
| 3,971,586 | 7/1976 | Saunders | 296/1 S |
| 3,972,556 | 8/1976 | Mason | 296/1 S |

Primary Examiner—Joseph F. Peters, Jr.
Assistant Examiner—John A. Pekar
Attorney, Agent, or Firm—B. B. Olive

[57] ABSTRACT

An air deflector secured rigidly to the cabin roof of the tractor of a tractor-trailer rig includes a pair of side panels which converge in a forward juncture line. Each panel is inwardly and rearwardly inclined from the forward juncture line at a substantially constant angle of attack "X" of between 20° and 30° off the vertical and each panel is shaped with concave-convex curvature for channeling the air rearwardly and upwardly. The deflector is capable of effectively diverting both high and low speed air currents to reduce engine strain and fuel consumption at all vehicle speeds.

5 Claims, 8 Drawing Figures

U.S. Patent  April 4, 1978  Sheet 1 of 2  4,082,341

VEHICLE AIR DEFLECTOR

BACKGROUND OF THE INVENTION

1. Field of the Invention

This invention relates generally to reducing aerodynamic drag and is directed particularly to reducing air drag imposed on the frontal surface of trailers being towed by tractors of the large tractor-trailer rig type.

2. Description of the Prior Art

Tractor-trailer rigs on the highways are faced with directly striking air currents which impinge against the forward walls of the trailers. These currents become increasingly greater as the speed of the vehicle increases. Prior attempts to reduce the drag caused by these currents have met with partial success. U.S. Pat. No. 3,695,673 describes an air deflector comprising a generally plow-shaped shield affixed to the roof of the tractor. Each side panel of this patented deflector presents a single concave surface which defines a valley extending from the base of the deflector upwardly to the top edge of the deflector. U.S. Pat. No. 3,947,065 describes a similar plow-shaped deflector which has a pair of concave side panels with the concavity of each panel being uniform from its base to its upper edge. A primary drawback of these patented deflectors is that they materially reduce drag only at high speeds. Furthermore, it has been found that the fully open tops of these deflectors allow air currents to whip back behind the deflector resulting in increased drag.

SUMMARY OF THE INVENTION

According to the present invention, an air deflector having a pair of divergent, rearwardly inclined side panels is rigidly secured to the cabin roof of a tractor of a tractor-trailer rig. The panels converge at a forward juncture line and each panel is inwardly and rearwardly inclined at a constant angle of attack between 20°-30° from vertical. Each panel includes a first concave surface for diverting high speed air currents, defined as above 55 m.p.h., and a second convex surface forming a continuation of the concave surface. Low speed air currents, i.e., below 55 m.p.h., maintain a laminar flow over both the convex and concave surfaces and separate at the trailing edges of the panels. A small turned-back portion at the apex of the juncture line reduces the amount of air which passes over the panels to form swirling eddies between the tractor and the trailer. The compound curvature and constant inclined surface features of the deflector have provided fuel savings of 12-23% and have added extra road speed for the same horsepower.

DESCRIPTION OF THE PREFERRED EMBODIMENT

Figure 1:
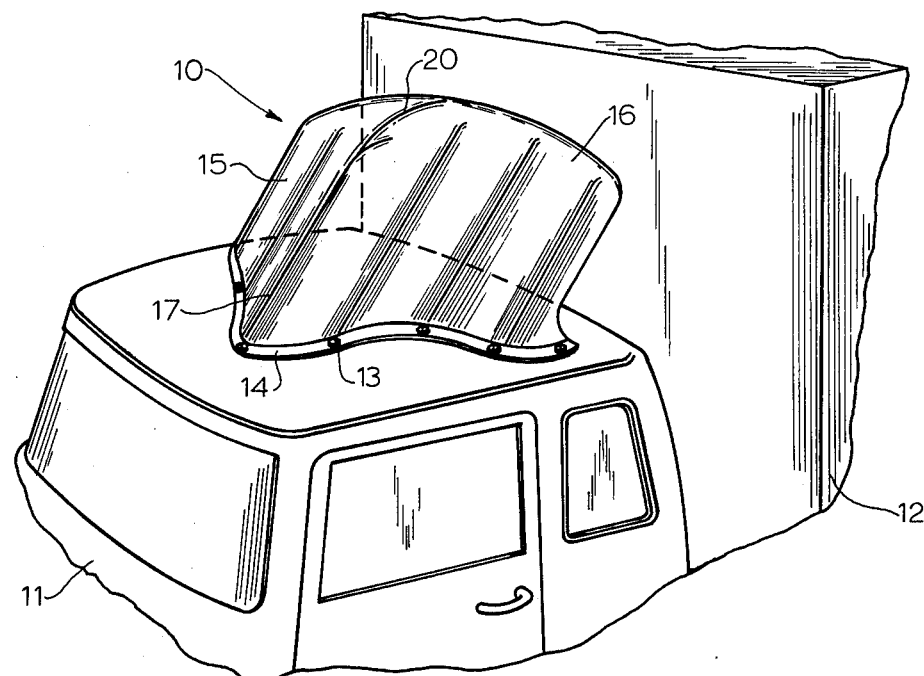
FIG. 1 is a fragmentary perspective view of the vehicle air deflector of the present invention with the same mounted on the top of the cabin of a tractor-trailer rig.
Figure 2:
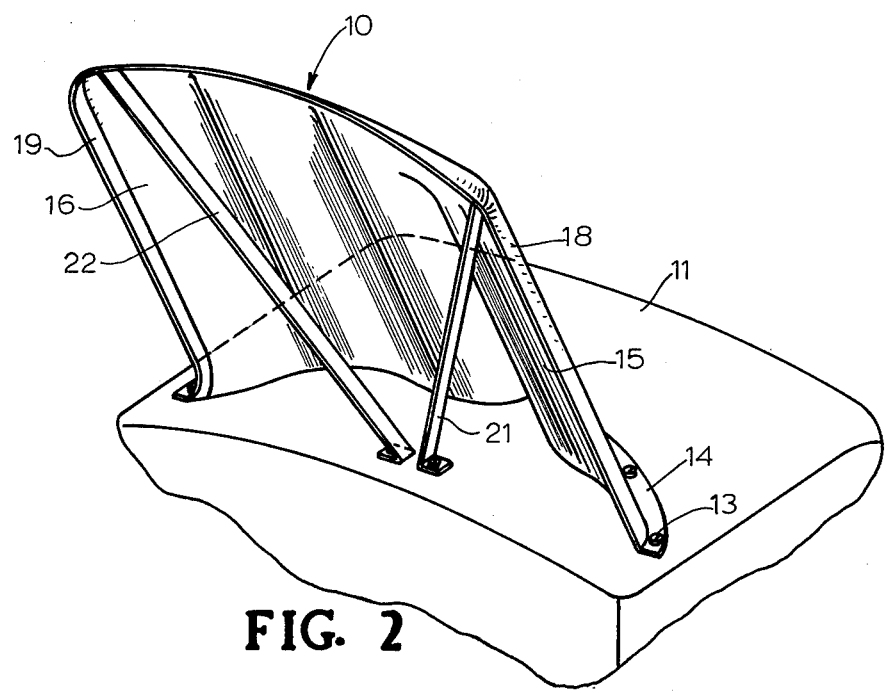
FIG. 2 is an enlarged, rear, fragmentary perspective view of the vehicle air deflector of FIG. 1 and illustrating the bracing for the device.
Figure 3:
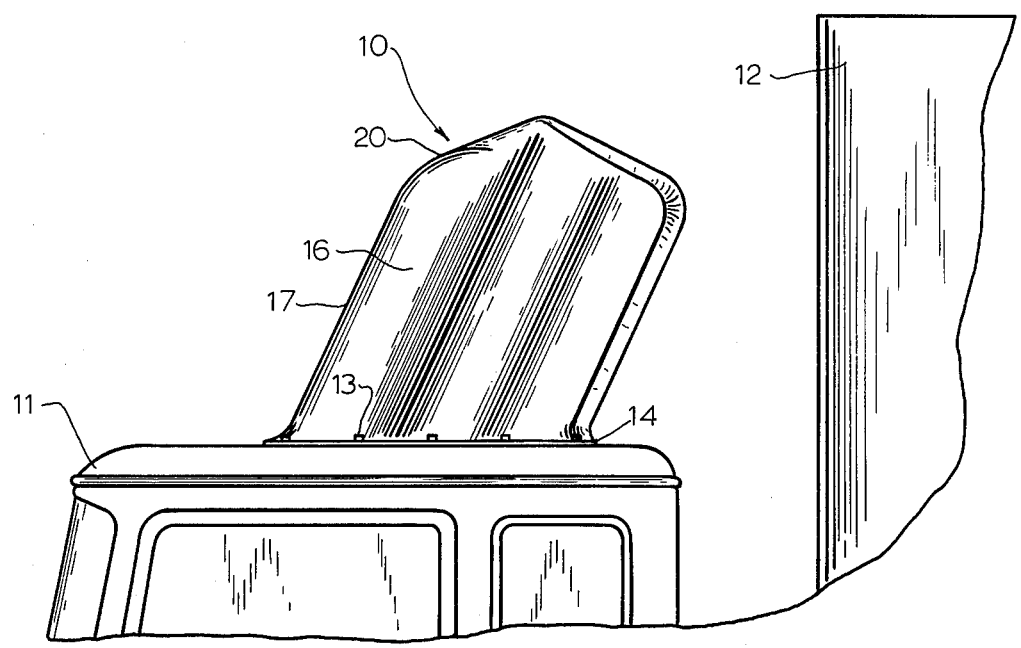
FIG. 3 is a side elevation view of the device of FIGS. 1 and 2.
Figure 4:
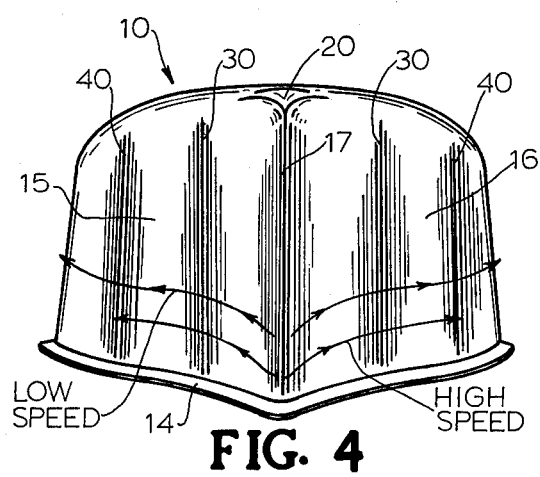
FIG. 4 is a front, pictorial view of the vehicle air deflector of the present invention.
Figure 5:
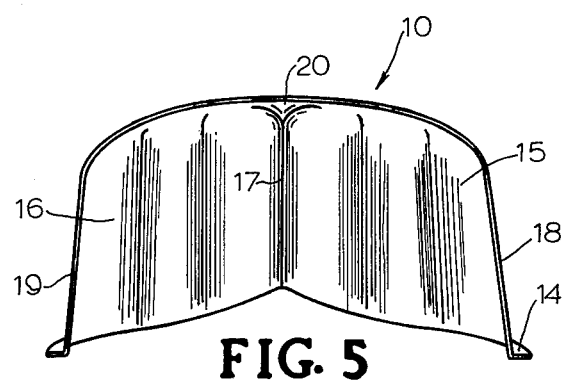
FIG. 5 is a rear, pictorial view of the device of FIG. 4.
Figure 6:
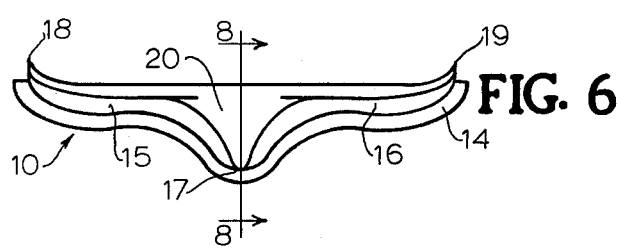
FIG. 6 is a top plan view of the device of FIGS. 4 and 5.
Figure 7:
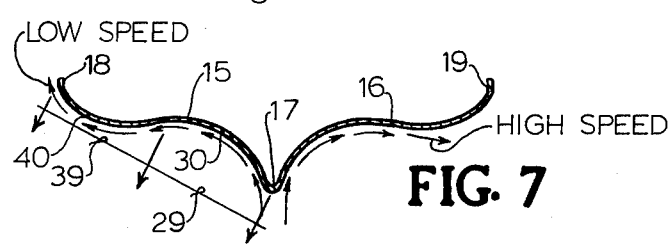
FIG. 7 is a section view taken substantially along line 7—7 of FIG. 8.
Figure 8:
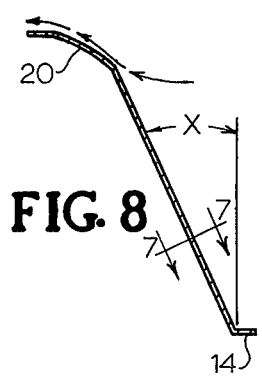
FIG. 8 is a section view taken substantially along line 8—8 of FIG. 6.

In FIGS. 1 through 3, a vechicle, shown to be a tractor 11 pulling a trailer 12, is shown with the air deflector 10 being rigidly secured to the cabin top of tractor 11. Defelctor 10 is secured to the cabin top by means of bolts 13 which pass through an outwardly turned lip portion 14 and fasten into the cabin top. Lip portion 14 preferably forms an airtight seal with the cabin top although such a seal is not necessary to satisfactory operation. As a secondary means of support, a pair of braces 21, 22 are rigidly secured to the upper edge portions of the deflector 10 and extend downwardly to points on the cabin roof where they are fastened in place (see FIG. 2). Air deflector 10 is formed in a substantially open V-shape including a pair of side panels 15, 16 which converge at a forward juncture line 17 and terminate respectively in trailing edges 18, 19. As best shown in FIGS. 4 and 7, the front face of each panel 15, 16 has a concave-convex curvature defining both a valley surface 29 having a midline 30 and an elongated mound surface 39 having a midline 40. Lines 30 and 40 extend substantially from the base to the upper edge of the panels 15, 16 and are parallel to juncture line 17. A fundamental characteristic of the panels 15, 16 is that all lines in the panels 15, 16 which are parallel to juncture line 17 (e.g., lines 30, 40) have a substantially uniform angle of attack "X" where the angle of attack is defined as the angle any such line makes with the vertical. FIG. 8 illustrates the angle of attack "X" at the juncture line 17. This angle of attack "X" remains substantially constant along all lines on the panels 15, 16 which are parallel to juncture line line 17. In the preferred embodiment which is designed for use with conventional tractor-trailer rigs, it has been found that an angle of attack "X" equal to 25° is desirable for effectively diverting air currents over the trailer top, with 20°-30° being an acceptable range.

A small turned-back portion 20 at the apex of juncture line 17 provides a smooth rearward deflection of air which contacts deflector 10 in this area (see FIG. 8). Turned-back portion 20 also servies to reduce the swirling air in the space between the deflector and the trailer, thereby reducing drag.

With reference to FIGS. 4 and 7, the flow of air currents over deflector 10 will now be explained. Deflector 10 is specifically designed to effectively divert air current striking the deflector at all speeds and thereby preventing such currents from impinging on the frontal surface of trailer 12. It has been found that the unique structure of deflector 10 causes low speed air currents to follow panels 15, 16 in a laminar flow from the juncture line 17 until the currents separate from the deflector at trailing edges 18, 19. Because of the constant angle of attack "X" in panels 15, 16, some of the air currents initially striking the deflector near its top will separate from the deflector at the upper edge surfaces rather than following the panels to their trailing edges 18, 19. Substantially all of the air currents leaving the deflector will have a sufficient upward velocity component to clear the upper surface of trailer 12 and sufficient outwardly divergent velocity components to clear the sides of the trailer. It has been found that high speed air currents striking deflector 10 will flow along the deflector only to the midlines 40 and separate from the deflector along these lines. This early separation occurs because the high speed air currents cannot maintain a laminar flow over the mounds 39 and, therefore, separate from deflector 10 in a somewhat turbulent flow. Through experimentation it has been found that deflector 10 is optimally designed when the separation at the midlines 40 occurs when the relative speed of the air currents impinging on deflector 10 is approximately 55 m.p.h. That is, low speed air currents are defined as being below 55 m.p.h., and high speed air currents above 55 m.p.h. By varying the relative curvatures of the side panels 15, 16, the line of demarcation between "high speed" and "low speed" air currents may be varied within certain limits. For example, in the preferred embodiment both the concave and convex surfaces have a radius of curvature of 15 inches. By increasing these radii of curvature the speed at which air currents will begin to separate along the mound midlines 40 will decrease to, for example, 50 m.p.h. By decreasing the radii of curvature such speed may be increased to, for example, 60 m.p.h.

In use, the operator need only secure deflector 10 to the top of the tractor cabin by means of bolts 13 and braces 21, 22 and their associated fasteners. Deflector 10 is preferably positioned as far as possible to the rear of the cabin top as shown in FIGS. 1, 2, and 3. No adjustment of the angle of attack or the like is necessary before use because the optimum shape and angles are built into the deflector design.

While specific features of the invention have been disclosed herein, it is to be understood that many minor modifications, substitutions, and equivalents may be made without departing from the scope of the invention.

What is claimed is:

1. A vehicle air deflector used in combination with a tractor pulling a trailer, said tractor including a cabin roof, said trailer including a front wall located behind and extending above said tractor cabin roof, said vehicle air deflector being formed as a substantially V-shaped structure comprising:

(a) a pair of side panels each having leading, trailing and upper edges and a base, said panels converging at their leading edges to form a juncture line which is inclined rearwardly at an angle of attack "X" between 20°–30° from the vertical, said panels diverging outwardly and rearwardly from said juncture line to their trailing edges, the front face of each said side panel having a concave-convex curvature characterized by a valley surface rearward of said juncture line and an elongated mound surface rearward of said valley surface and forward of the trailing edge, said valley surface and elongated mound surface extending substantially from the base to the upper edge of each panel (15), (16) and having midlines substantially parallel to said juncture line, and said panels being characterized by all lines thereon which are parallel to said juncture line having an angle of attack substantially equal to said angle of attack "X"; and (b) means for securing the base of said side panels to the tractor cabin roof.

2. A vehicle air deflector as claimed in claim 1 wherein a turned-back portion is formed at the apex of said juncture line.

3. A vehicle deflector as claimed in claim 1 wherein said securing means comprises an integral, outwardly turned lip portion at the base of said side panels in combination with fastener means passing through openings in said lip portion and fastening into said tractor cabin roof.

4. A vehicle air deflector as claimed in claim 3 wherein said securing means includes brace rods secured from the top of said deflector and extending downward to said tractor cabin roof and associated fasteners connecting said brace rods to said roof.

5. The vehicle air deflector of claim 1 wherein said angle "X" is approximately 25°.

* * * * *